United States Patent
Tiahrt (10) Patent No.: US 6,741,979 B1
(45) Date of Patent: May 25, 2004

(54) SYSTEM AND METHOD FOR FLEXIBLE INDEXING OF DOCUMENT CONTENT

(76) Inventor: Thomas W. Tiahrt, 3500 S Phillips Ave. Suite 201, Sioux Falls, SD (US) 57105

( * ) Notice: Subject to any disclaimer, the term of this patent is extended or adjusted under 35 U.S.C. 154(b) by 335 days.

(21) Appl. No.: 09/911,432

(22) Filed: Jul. 24, 2001

(51) Int. Cl.[7] .............................................. G06F 17/30
(52) U.S. Cl. ........................... 707/1; 707/6; 707/103 R; 715/501.1; 715/515
(58) Field of Search .......................... 707/1–6, 10, 100, 707/200, 103 R; 715/530, 531, 532, 533, 534, 501.1, 515; 703/22

(56) References Cited

U.S. PATENT DOCUMENTS

| | | | | |
|---|---|---|---|---|
| 5,778,378 A | * | 7/1998 | Rubin .................... | 707/103 R |
| 5,949,410 A | * | 9/1999 | Fung ...................... | 715/500.1 |
| 5,974,413 A | * | 10/1999 | Beauregard et al. .......... | 707/6 |
| 6,266,682 B1 | * | 7/2001 | LaMarca et al. ......... | 715/501.1 |
| 6,269,380 B1 | * | 7/2001 | Terry et al. ................. | 707/200 |
| 6,324,551 B1 | * | 11/2001 | Lamping et al. ............ | 715/500 |
| 6,330,573 B1 | * | 12/2001 | Salisbury et al. ........... | 715/511 |
| 6,397,231 B1 | * | 5/2002 | Salisbury et al. ........... | 715/515 |
| 6,446,081 B1 | * | 9/2002 | Preston .................... | 707/104.1 |
| 6,539,374 B2 | * | 3/2003 | Jung ............................. | 707/4 |
| 6,562,076 B2 | * | 5/2003 | Edwards et al. ............ | 715/515 |

OTHER PUBLICATIONS

Vasconcelos, Nuno et al., "A Bayesian Framework for Content–based Indexing and Retrieval" Proceedings Data Compression Conference, Mar. 30–Apr., 1998, abstract only, p. 580.*

Bordogna, Gloria et al., "A user–adaptive indexing model of astructured documents", The 10th IEEE International Conference on Fuzzy Systems, Dec. 2–5, 2001, pp. 984–989, vol. 3.*

* cited by examiner

*Primary Examiner*—Shahid Alam (57) ABSTRACT

A system and method for flexible indexing of document content for facilitating the rapid search and retrieval of large collections of documents. The method for flexible indexing of document content includes obtaining a collection of documents to be indexed, storing the collection of documents in a single document information stream, parsing each one of the documents into constituent words to facilitate indexing, creating a plurality of stem words to be indexed by stemming each word into a standard prefix; and indexing each stem word. Stem words may be indexed character-by-character based on character frequency, into either primary or secondary fixed-size records or secondary overflow records. Each stem may be terminated by a translation vector record number. Document locations may be accessible through the translation vector record number. Translation vector entries specify each stem word's location by stream identification number and record number. Locations may be grouped by count in streams of fixed-size records.

26 Claims, 8 Drawing Sheets

Figure 1

First Record

64 Entries of 8 byte Each (2-32 (4 byte) bit entries)

| E | A | I | S | R | N | O | T |
|---|---|---|---|---|---|---|---|
| L | C | D | U | M | H | P | G |
| B | F | Y | K | V | W | X | Z |
| J | Q | 0 | 1 | 2 | 3 | 4 | 5 |
| 6 | 7 | 8 | 9 | . | , | ; | " |
| ' | ` | \| | > | < | : | ? | = |
| { | } | @ | _ | ~ | \ | + | - |
| * | / | ( | ) | $ | ! | % | ^ |

4 Bytes | 4 Bytes
Next Portion | Translation Vector Portion

Stream

| 32 Bits<br>4 Bytes<br>Pairs Stored in Stream | 32 Bits<br>4 Bytes<br>Unused | 32 Bit Document<br>Ordinal | 32 Bit Document<br>Location |
|---|---|---|---|
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |
| 32 Bit Document<br>Ordinal | 32 Bit Document<br>Location | 32 Bit Document<br>Ordinal | 32 Bit Document<br>Location |

Figure 6

SYSTEM AND METHOD FOR FLEXIBLE INDEXING OF DOCUMENT CONTENT

BACKGROUND OF THE INVENTION

Incorporation by Reference

This patent application discloses an invention which may optionally form a portion of a larger system. Other portions of the larger system are disclosed and described in the following co-pending patent applications, all of which are subject to an obligation of assignment to the same person. The disclosures of these applications are herein incorporated by reference in their entireties.

- METHOD AND SYSTEM FOR AUTOMATIC HARVESTING AND QUALIFICATION OF DYNAMIC DATABASE CONTENT, William J. Bushee, Thomas W. Tiahrt, and Michael K. Bergman, and Filed Jul. 24, 2001, application Ser. No. 09/911,522 now pending.
- SYSTEM AND METHOD FOR EFFICIENT CONTROL AND CAPTURE OF DYNAMIC DATABASE CONTENT, William J. Bushee and Thomas W. Tiahrt, Filed Jul. 24, 2001, application Ser. No. 09/911,434 now pending.

1. Field of the Invention

The present invention relates to radix search tries and more particularly pertains to a new system and method for flexible indexing of document content for facilitating the rapid search and retrieval of large collections of documents.

2. Description of the Prior Art

The use of lexicographic (digital) search trees is known in the prior art. A radix search trie is a digital search tree with a fixed alphabet size. Each edge in the trie represents a character in the alphabet. Each internal node represents a string prefix. Each external node represents a string. The tree records the minimal prefix set of characters required to differentiate all strings in the string set. Strings are found by following an access path defined by the string's characters.

Trie variations have developed into three broad categories: array based tries, where arrays of pointers are used to access subtrees; binary search tree based tries, where a binary tree is used to traverse the trie; and list based tries, where linked lists provide access linkage.

Array lookup can be relatively fast, but is typically limited to small alphabet sizes, since large-sized alphabets have too many null pointers. Binary search trees are relatively compact, but each bit must be examined, so binary search trees are relatively slower than arrays. Linked lists are relatively more storage efficient than arrays, but have relatively slower access times than arrays.

When extremely large numbers of strings are to be indexed, storage efficiency relatively greater than an array trie, and relatively faster access than a linked list trie or binary search trie is desirable.

SUMMARY OF THE INVENTION

In view of the foregoing disadvantages inherent in the known types of radix search tries now present in the prior art, the present invention provides a new system for flexible indexing of document content wherein the same can be utilized for facilitating the rapid search and retrieval of large collections of documents.

The invention contemplates a method for flexible indexing of document content, and includes obtaining a collection of documents to be indexed, storing said collection of documents in a single document information stream, parsing each one of said documents into constituent words to facilitate indexing, creating a plurality of stem words to be indexed by stemming each word into a standard prefix, and indexing each stem word.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new system and method for flexible indexing of document content embodying the principles and concepts of the present invention will be described.

As best illustrated in FIGS. 1 through 6, the system 10 for flexible indexing of document content and characterizations generally comprises a computer system 20, an indexing module 30, a plurality of records 50, and a plurality of streams 60.

Figure 1:
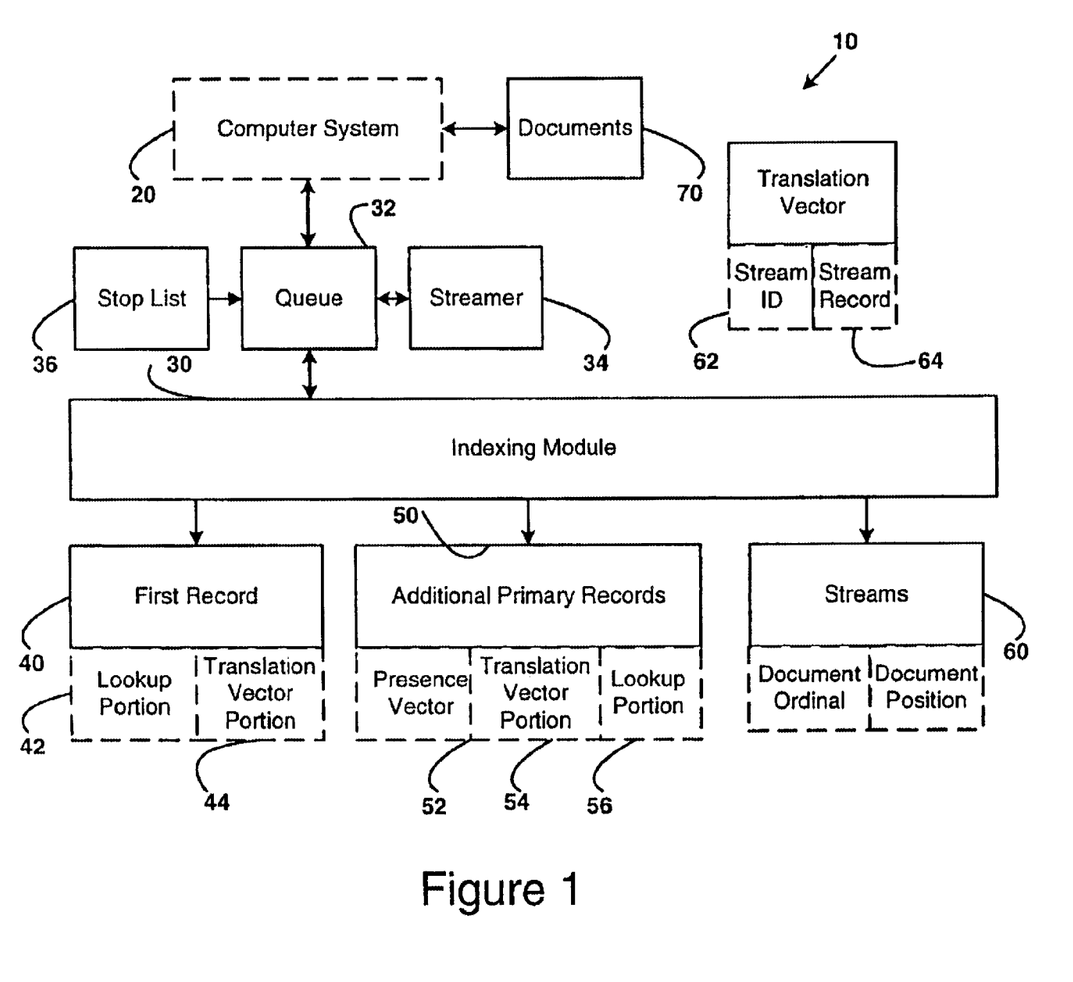
FIG. 1 is a schematic functional interconnect view of a new system and method for flexible indexing of document content and characterizations according to the present invention.

The computer system 20 includes a storage means for facilitating the retention and recall of a collection of documents to be indexed.

The indexing module 30 is used for developing a character-by-character index of words occurring in the collection of documents. The plurality of records 50 provides the character-by-character addressing for the indexing module. The plurality of streams 60 is used by the indexing module 30 for recording locations in the collection of documents 70 where each indexed word occurs.

In a preferred embodiment, the indexing module 30 further comprises a stemmer 34 for stripping suffixes from words to simplify indexing. The indexing module 30 may also include a queue 32 for holding documents from the document collection during stemming and indexing. A stop list 36 may be used to avoid processing words which do not add value to the index.

Figure 2:
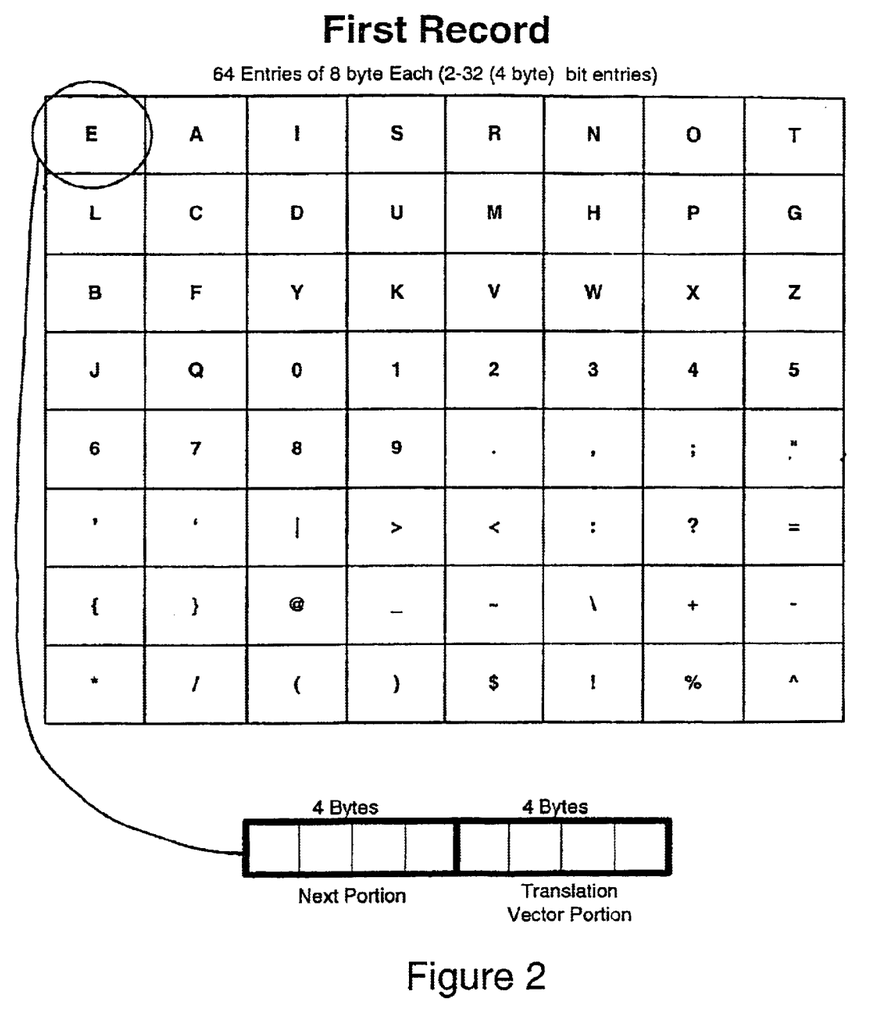
FIG. 2 is a schematic block representation of a first record of the index of the present invention.
Figure 3:
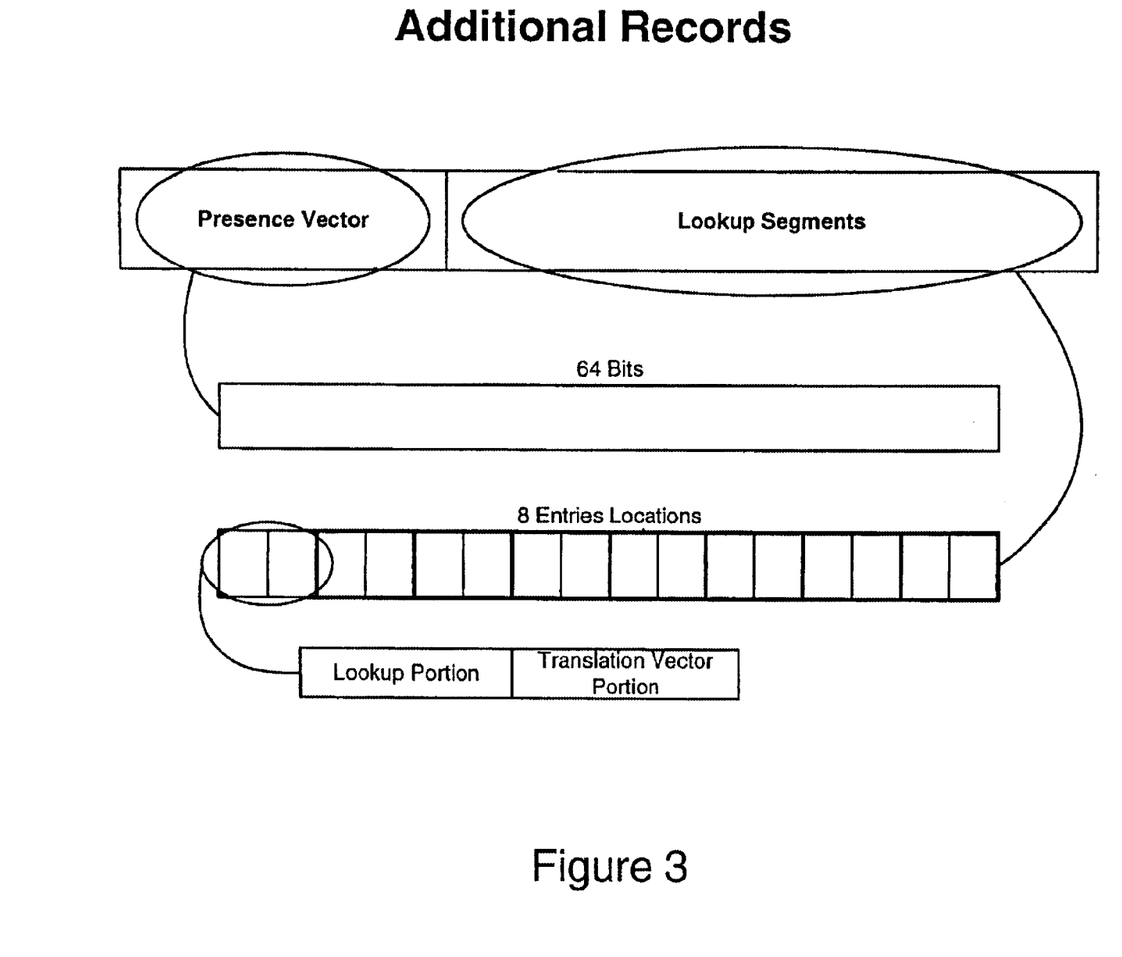
FIG. 3A is a schematic block representation of an additional primary record of the index of the present invention.
FIG. 3B is a schematic block representation of an additional secondary record of the index of the present invention.
Figure 3A:
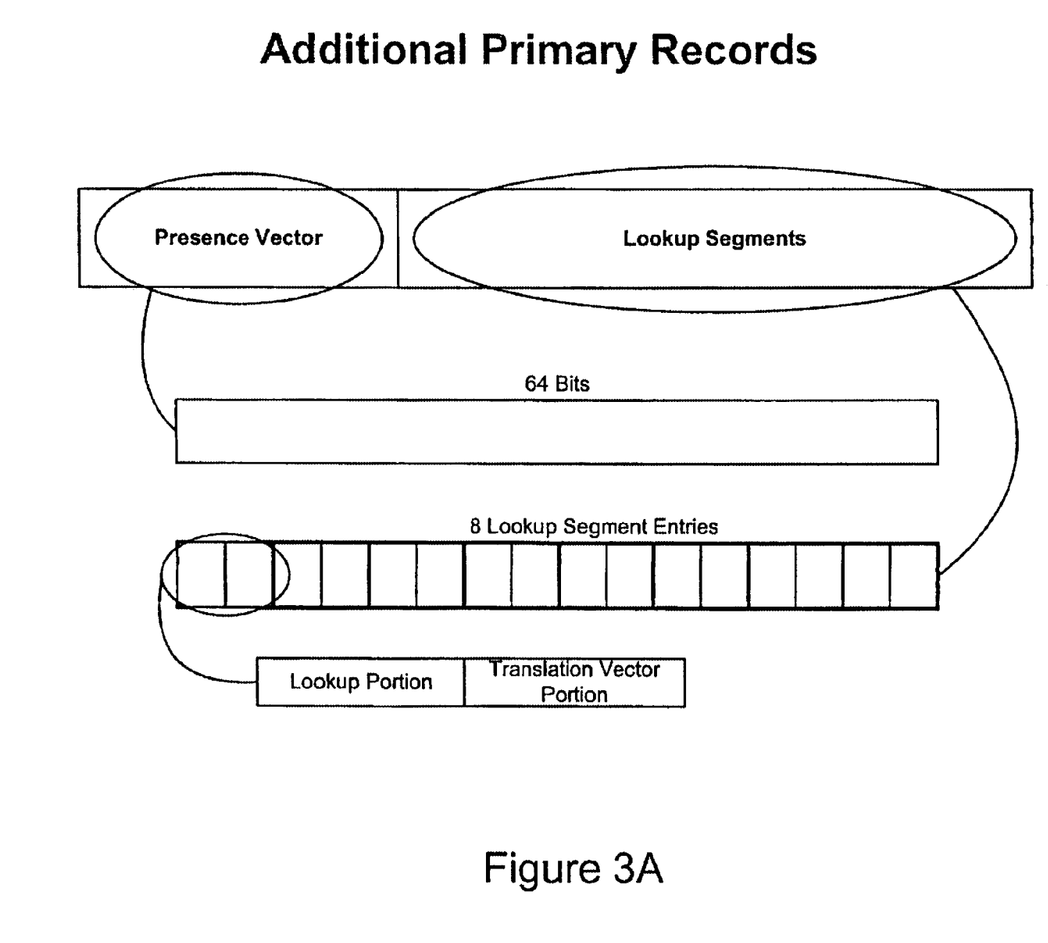
Figure 3B:
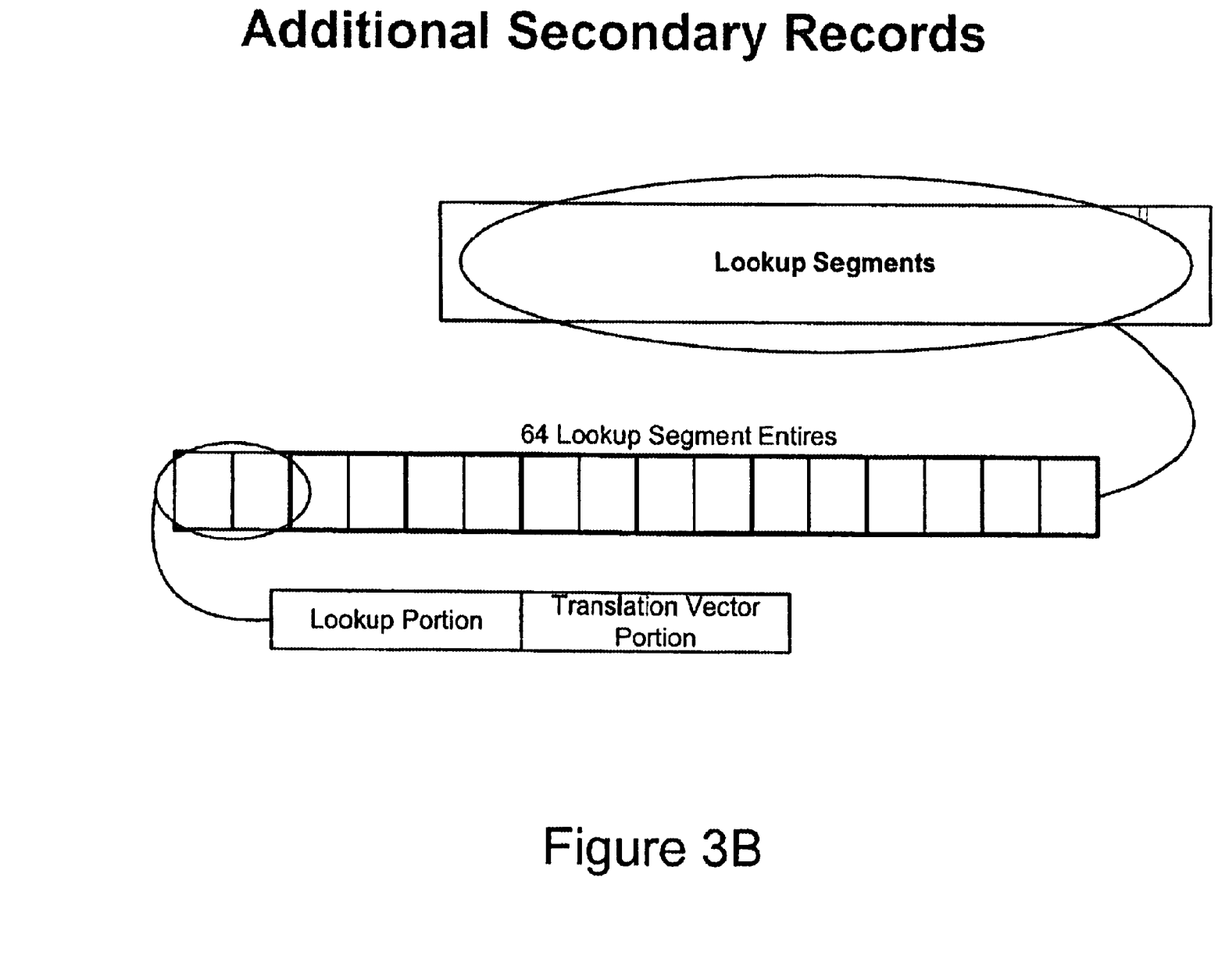

In an embodiment, the plurality of records may further comprise a first record 40 and a plurality of additional primary 50 and secondary 80 records. The first record 40 provides an entry point into the index, and further comprises a plurality of entry records 40. Each one of the entry records 40 is uniquely associated with a character out of a character set. Each one of the collection of documents is formed by characters drawn from the character set. Each one of the additional records 50 provides a character-by-character pathway for locating an occurrence of a word in the collection of documents.

In a further embodiment, the entry record 40 further comprises a lookup portion 42 and a translation vector portion 44. The lookup portion 42 represents a record location for a first one of the additional records 50, which provides a pathway to a next character in the character-by-character pathway. The translation vector portion 44 represents a location in one of the plurality of streams, which provides a cross-reference to an occurrence of the word in the collection of documents.

In a preferred embodiment the entry record 40 may use 32 bits for the lookup portion 42 and 32 bits for the translation vector portion 44.

In a preferred embodiment each one of the plurality of additional primary records 50 comprises a presence vector 52 of 64 bits, and a plurality of 64-bit lookup segments. Each bit in the presence vector 52 is uniquely associated with a character from the character set and provides an indication of a word continuing with the associated character.

Each one of the plurality of lookup segments may further comprise a lookup portion 56 and a translation vector portion 54. The lookup portion 56 represents a record location for a next one of the additional records 50, which provides a pathway to a next character in the character-by-character pathway. The translation vector portion 54 specifies a record number in the translation vector which defines a location in one of the plurality of streams 60, which provides a cross-reference to an occurrence of the word in the collection of documents.

In a preferred embodiment of the additional primary records, the plurality of lookup segments may comprise eight pairs of lookup portions 56 and translation vector portions 54. Each of the lookup portions 56 may further comprise 32 bits.

Similarly, in the preferred embodiment of the additional secondary records, the plurality of lookup segments may comprise sixty-four pairs of lookup portions and translation vector portions. Each of the lookup portions may further comprise 32 bits.

Figure 4:
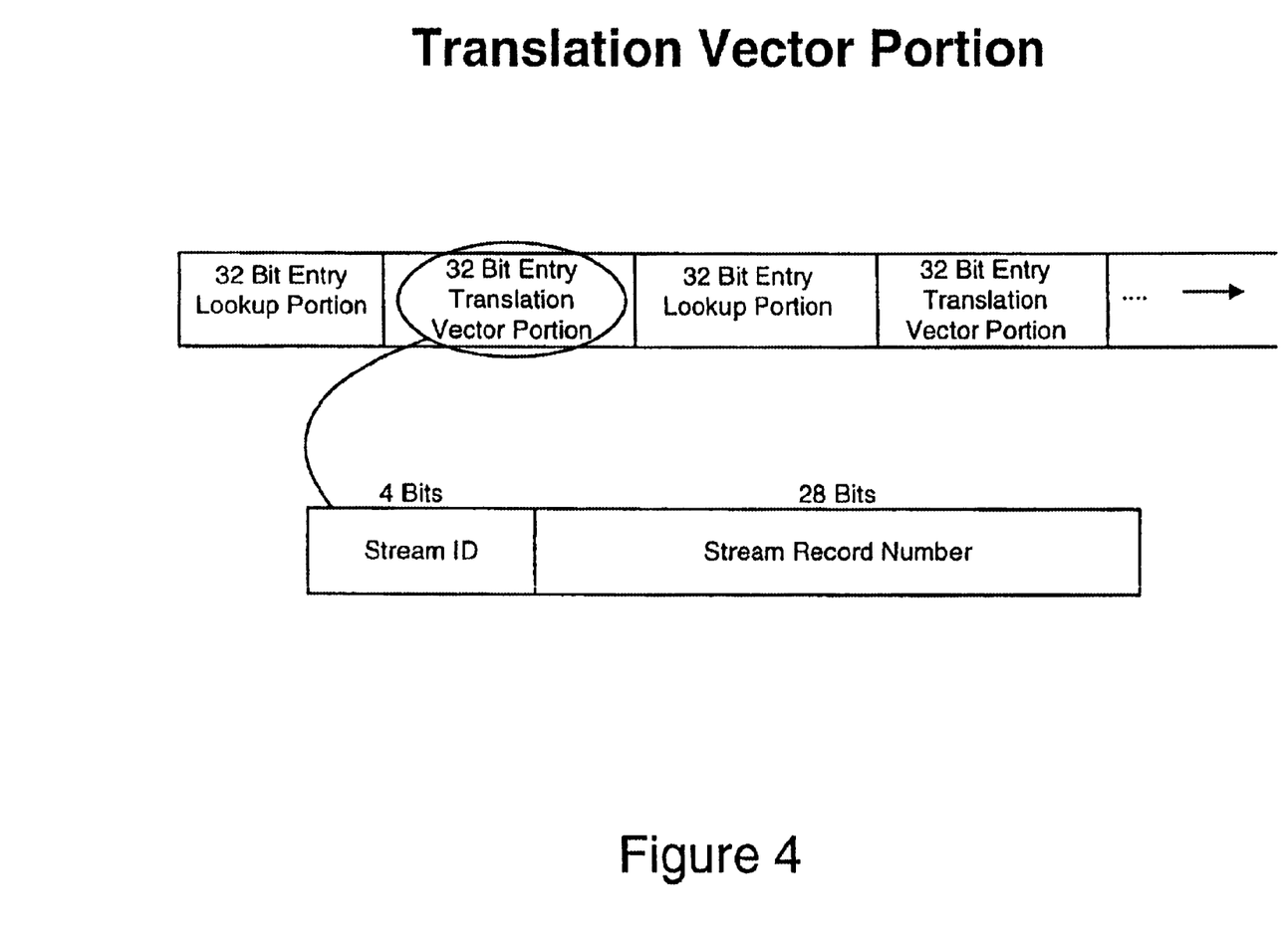
FIG. 4 is a schematic block representation of a translation vector portion of an additional record of the index of the present invention.
Figure 5:
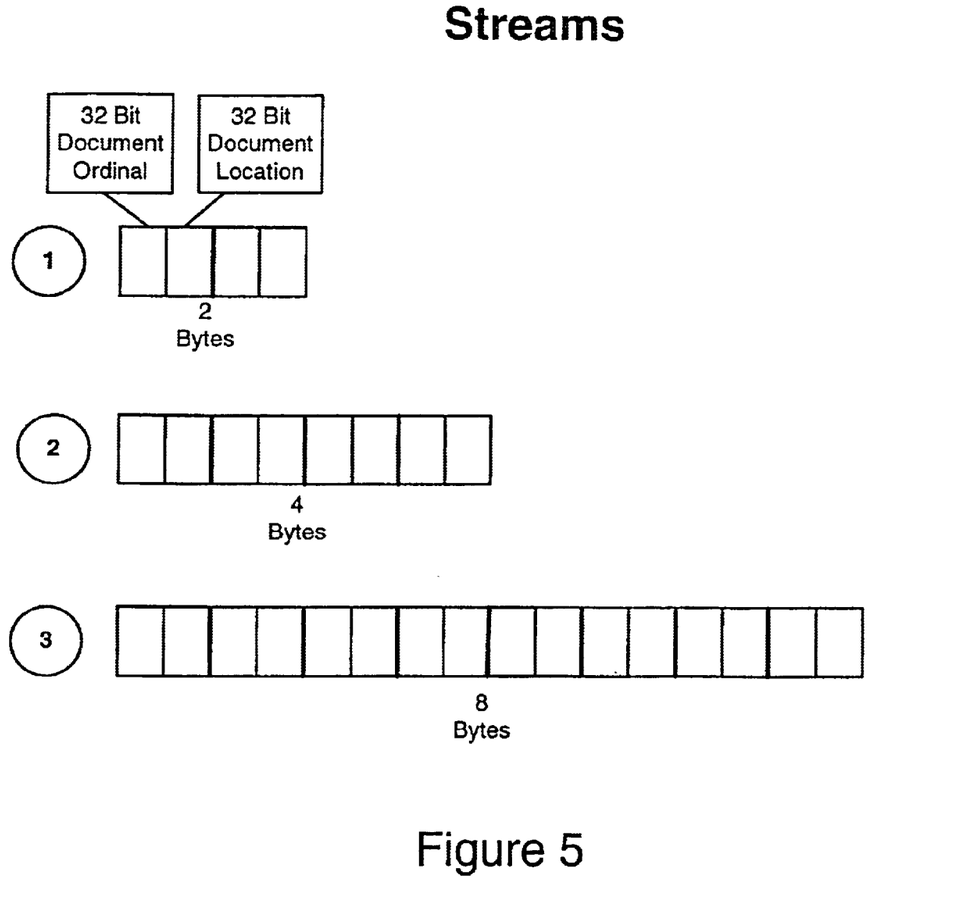
FIG. 5 is a schematic block representation of streams of the index of the present invention.

Each of the translation vector portions 54 may further comprise a 32-bit translation record number, specifying a translation entry, defining a 4-bit stream ID 62 and a 28-bit record number. The stream id 62 identifies which one of the plurality of streams records 60 cross-reference information for locating occurrences of the word in the collection of documents. The record number 64 provides a location within the stream 60 of the cross-reference information.

The maximum benefit of the method for flexible indexing of documents is realized when coupled with the use of information streams for storing all words and locations of words in the collection of documents to be indexed. All of the documents are stored in an end-to-end configuration with a starting point in the stream being indexed to facilitate finding the beginning point of each of the documents in the stream. Similarly, offsets are indexed to provide locations of specific words within the documents of the information stream.

A flexible index is built or constructed for the collection of documents to facilitate searching through the collection for the occurrence of words, word fragments, or phrases. The process begins with obtaining a collection of documents to be indexed. Each of the documents is most preferably individually processed for indexing. The processing of the document includes parsing the document into discrete words for indexing.

A listing of words that are not to be indexed, sometimes referred to as a "stop list" may be obtained and consulted. The stop list includes words which are not considered to provide value to the indexing structure for a particular subject or category of information. Illustrative examples of words which may be included on a stop list include parts of speech such as the articles "a", "an", and "the". These words are not further processed for indexing, but are retained in the document in the information stream.

The remaining words of the document are stemmed using a stemming algorithm. In a preferred embodiment, a conventional stemming algorithm known as a Porter stemmer is used for this function. The Porter stemmer is a process for removing the more common morphological and inflectional endings from words in English. The algorithm was originally described in *Porter*, M. F., 1980, An algorithm for suffix stripping, Program 14(3):130–137. The Porter stemmer is a rule-based algorithm commonly used in the area of information retrieval. As an example of the stemming process under the Porter stemmer, consider the five words "preference", "preferred", "preferably", "preferential", and "preferentially". The first three words would be stemmed or truncated into the form "prefer", while the last two words would be stemmed into the form "preferenti". If a user wanted to search the collection of documents for the word "prefer", all documents containing that word stem would be returned. Thus documents containing "preference", "preferred", "preferably" would be returned in response to the search, but documents containing only "preferential" and "preferentially" would not be returned.

After the words of the document are stemmed, each word or stemmed form of the word is indexed on a character-bycharacter basis. Because the indexing process is performed on a character-by-character basis the index may be viewed as a series of directions to be followed to build a word or stem. To further clarify the overall process of indexing according to the invention, an example word, "tyler", will be followed through each step of indexing.

The index preferably includes a first lookup segment record, multiple additional primary records, multiple additional secondary records, a translation vector, and multiple stem location information streams.

The first record of the index may comprise a plurality of entry blocks, with each entry block being uniquely associated with one character out of a character set which makes up the collection of documents. Each of the entry blocks may further comprise a lookup portion and a translation vector portion. The lookup portion describes which additional record contains the next letter in the word or stem being indexed. The translation vector portion describes where to find a cross-reference to each document in the collection which contains the word.

In a preferred embodiment, each of the records is optimized for character frequency in the collection of documents being indexed. An illustrative example of this optimization is shown in the table below, where entry blocks 1 through 16 are on the top row, entry blocks 17 through 32 are on the second row from the top, entry blocks 33 through 48 are on the second row form the bottom, and entry blocks 49 through 64 are on the bottom row. Each of the entry blocks is associated with the character shown.

When more than 8 lookup segments are required, the plurality of lookup segments is stored in fixed-size records each containing 64 lookup segments.

Returning to the example, and assuming that the presence vector has the same ordered layout of characters as the first record, the next letter to locate is "y", which would correspond to position 19 in the presence vector. If position 19 in this additional record does not indicate a presence of a "y" during searching, then no words in the collection of documents contains a first letter of "t" and a second letter of "y". During the indexing phase, this additional record is created, and updated for each word which starts with "t". The plurality of lookup segments may contain a plurality of pairs of lookup portions providing a location (index) for each additional record for continuing words starting with "ty". Examples of words falling into this group may be "tyke" which would trace to a next record associated with "k", "type", "typhoid" or "typify" which would all trace to a next additional record associated with "p", or "tyrannosaurus" which would trace to a next additional record associated with "r". Additionally, the plurality of lookup segments may contain a plurality of translation vector portions providing a location of any occurrence of the word "ty".

Continuing with the example, the additional record associated with "l" for the "ty" string would lead to an additional record associated with "e" for the string "tyl", which would in turn lead to another additional record associated with "r" for the string "tyle". This final additional record for our example may have lookup portions leading to words such as "tyler's". (Note that "tylers" stems to "tyler", while "tyler's"

| e | a | i | s | r | n | o | t | l | c | d | u | m | h | p | g |
|---|---|---|---|---|---|---|---|---|---|---|---|---|---|---|---|
| b | f | y | k | v | w | x | z | j | q | 0 | 1 | 2 | 3 | 4 | 5 |
| 6 | 7 | 8 | 9 | . | , | ; | " | ' | | \| | > | < | : | ? | = |
| { | } | @ | — | ~ | \ | + | - | * | / | ( | ) | $ | ! | % | ^ |

In a preferred embodiment the character set is restricted to 64 characters and all alphabetic characters are set to lower case.

The lookup portion of the entry block may be a 4-byte representation of an index number for the next additional record to be examined. In the "tyler" example, the first letter, "t", is associated with data entry block 8 of the first record. Examining entry block 8, the lookup portion would provide a 4-byte record number (address) of the next record, an additional record, to examine. The lookup portion would provide a 4-byte record number to the additional record associated with "t". The translation vector portion is also a 4-byte representation. In the example, the translation vector portion may contain no information (e.g., four zero bytes), as just "t" does not constitute a word, a word fragment, or a phrase to be searched.

Each of the additional records may comprise a presence vector portion and a plurality of lookup segments. In a preferred embodiment, the presence vector is a 64-bit representation with each position uniquely corresponding to one of the characters making up the character set for the collection of documents.

Each of the plurality of lookup portions of each additional record comprises a lookup portion and a translation vector portion similar to the first record. In a preferred embodiment, the 8 pairs of a lookup portion with a translation vector portion make up the plurality of lookup segments.

stems to "tyler's".) Additionally, this final additional record may have a translation vector portion for finding "tyler" in the multiple information streams.

In a preferred embodiment, translation vector portion may comprise a translation vector record number, corresponding to a translation entry containing a 4-bit stream ID segment to select which one of the multiple streams contains the information for a word being searched ("tyler" in our example) and a 28 bit stream record number providing a location in the selected stream.

Figure 6:
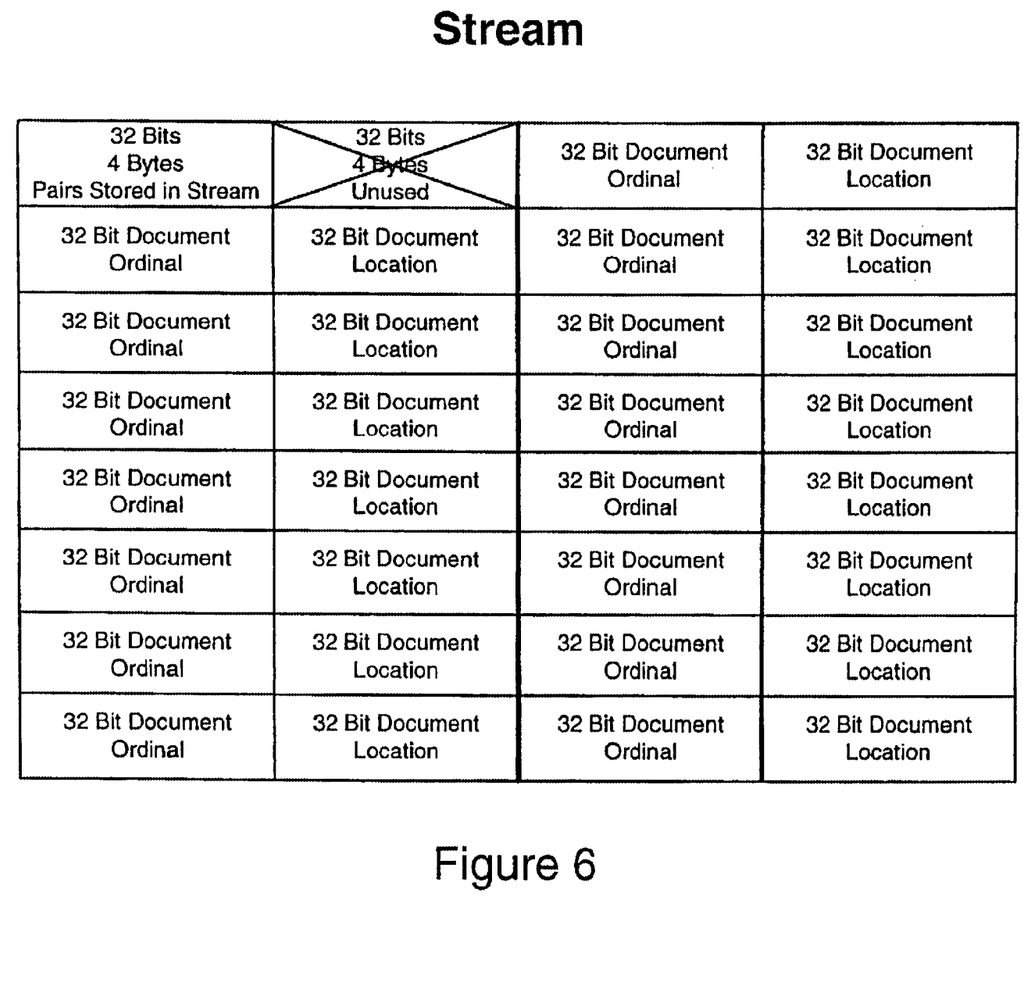
FIG. 6 is a schematic block representation of a stream of the index of the present invention.

Each stream comprises a plurality of pairs of document ordinals and document locations. Each document ordinal provides a starting point for an associated document in the document information stream (which contains every document in the collection). Each document location provides an offset to find an instance of the specific word being indexed or searched ("tyler" in our example). One pair of document ordinal and document location is created during indexing for each occurrence of every word being indexed.

In a preferred embodiment, 16 streams are utilized, each one having a record length different than all other streams. A first one of said streams comprises 16 pairs of document ordinals and document locations. A second one of said streams comprises 32 pairs of documents ordinals and document locations. This doubling of size continues through each of the streams such that a sixteenth one of said streams comprises 524,288 pairs of document ordinals and document locations.

In another preferred embodiment, 16 streams are utilized, each one having a length different than all other streams. A first one of the streams comprises 16 pairs of document ordinals and document locations. A second one of the streams comprises 64 pairs of document ordinals and document locations. This quadrupling continues through a sixth one of the streams, which comprises 16,384 pairs of document ordinals and document locations. The size of each succeeding one of the streams doubles over each proceeding stream from a seventh one of the streams such that a sixteenth one of said streams comprises 16,777,216 pairs of document ordinals and document locations.

In a preferred embodiment, each one the document ordinals and each of the document locations may comprise a 32-bit representation. Additionally, a first one of the document ordinals in a stream may be replaced with a 32-bit representation of the number of pairs stored in the stream.

In a preferred embodiment of the invention, new stem words from new documents may be added to the index. When a stem is presented for insertion, the character access path is traversed through the first record, and any required primary or secondary records. Traversal either finds a recorded stem, or a terminal node without reaching the last stem character. Existing stems are processed in the same manner as stem retrieval, while new stem characters are added in entries of either existing nodes or new nodes. New nodes are placed in the next available primary record.

Once a terminal node is established, a new translation vector entry is identified. This entry number is saved in the translation vector portion of the terminal node's lookup segment. The next available record is retrieved from the first stream. Its value is stored in the translation vector. Since it is the first stream, and the 4-bit stream ID is already set to zero, its value need not be set. Subsequent additions to existing location records preserve ascending document ordinal and document location ordering.

Existing stem positions in new documents are stored by following the traversal path to the stem's terminal node, obtaining the translation vector entry number, retrieving the translation entry, decoding the stream ID and record number, and accessing the location record. The location record's count is interrogated to determine whether there is room to store the new location. If adequate space exists the location destination is found via a binary search, entries greater than the current instance are shifted up, and the document ordinal and document position inserted.

If adequate space does not exist in the current record, the entire contents are promoted to the next stream, and insertion takes place as described above. Records freed by previous promotion are chained in a singly linked list. Records are selected from the linked list if available. Otherwise a new record is acquired. The translation vector is updated to reflect the promotion. Organizing the location data in one record minimizes the access time required to retrieve all locations for one stem.

A bypass data listing may be utilized to compensate for words, which the user would stem differently than automatically created by the stemmer. This listing provides bypass-words which are not submitted to the stemmer and the desired stem to be used with each one of the by-pass words.

This process is performed for every word in the document collection which is not on the stop list to complete the indexing of the collection of documents. This index is used as a lookup table during searching of the collection of documents in response to a query by the user.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for flexible indexing of document content comprising:

obtaining a collection of documents to be indexed;

storing said collection of documents in a single document information stream;

parsing each one of said documents into constituent words to facilitate indexing;

creating a plurality of stem words to be indexed by stemming each word into a standard prefix;

creating a first record providing an entry point into an index structure, said first record having a plurality of entry blocks, each one of said entry blocks being uniquely associated with a character out of a character set, said collection of documents being formed by characters drawn from said character set;

creating a plurality of additional primary and secondary records providing character-by-character pathways for locating an occurrence of a stem word in said document information stream;

creating a translation vector mapping stem words to document locations; and creating a plurality of streams for providing locations of occurrences of said stem word in said document information stream.

2. The method of claim 1, wherein said step of creating a first record further comprises:

creating a plurality of lookup portions, each one of said lookup portions representing a record location, each record location being associated with a first one of said additional records, said first one of said additional records being associated with stem words beginning with said associated character;

creating a plurality of translation vector portions, each one of said translation vector portions specifying a translation entry and defining a location in one of said plurality of streams, each one of said streams providing a cross-reference to occurrences in said document stream of stem words which terminate after said associated character;

pairing each one of said plurality of lookup portions with an associated one of said plurality of translation vector portions to form a plurality of said entry blocks.

3. The method of claim 2, further comprises using 32-bit representations for each one of said plurality of lookup portions and each one of said plurality of translation vector portions such that each one of said entry blocks comprises 64 bits.

4. The method of claim 1, wherein said step of creating a first record further comprises associating each one of said entry blocks with a unique one of said characters in a frequency of usage order such that a first one of said entry blocks is associated with a character most frequently used in said collection of documents and a last one of said entry blocks is associated with a character least frequently used in said collection of documents.

5. The method of claim 1, wherein said step of creating a first record further comprises creating 64 entry blocks, each one of said entry blocks being uniquely associated with one of said characters.

6. The method of claim 1, wherein said step of creating a plurality of primary additional records further comprises:

creating a plurality of presence vectors;

creating a plurality of lookup segments;

pairing each one of said plurality of presence vectors with an associated one of said plurality of lookup segments, each pairing of presence vectors and lookup segments forming one of said plurality of additional records.

7. The method of claim 6, wherein said step of creating presence vectors further comprises using 64 bits to represent each one of said plurality of presence vectors, each one of said 64 bits being uniquely associated with one of said characters, each one of said 64 bits indicating a continuation of a stem word with said character.

8. The method of claim 6, wherein said step of creating a plurality of lookup segments further comprises:

creating a plurality of lookup portions, each one of said lookup portions representing a record location for one either of said additional primary and secondary records, either of said additional primary and secondary records being associated with stem words which continue with an associated character;

creating a plurality of translation vector portions, each one of said translation vector portions specifying a translation entry in said translation vector and defining a location in one of said plurality of streams, each of said streams providing a cross-reference to occurrences in said document information stream of stem words which terminate after said associated character;

pairing each one of said plurality of lookup portions with an associated one of said plurality of translation vector portions to form a plurality of lookup segments.

9. The method of claim 8, further comprises using 32-bit representations for each one of said plurality of lookup portions and each one of said plurality of translation vector portions such that each one of said lookup segments comprises 64 bits.

10. The method of claim 9, further comprises:

using 4 bits in said translation vector entry to represent a stream ID, said stream ID indicating which one of said plurality of streams contains location information for occurrences of an associated stem word in said document information stream;

using 28 bits in said translation vector entry to represent a stream record number providing a location in said one of said plurality of streams where location information for occurrences of an associated stem word in said document information stream is placed.

11. The method of claim 1, wherein said step of creating a plurality of streams further comprises:

creating a plurality of document ordinals, each document ordinal providing a starting location in said document information stream for a document containing said stem word;

creating a plurality of document locations, each one of said plurality of document locations providing an offset from said starting location, said offset providing a starting point for said stem word in said document;

pairing each one of said plurality of document ordinals with one of said document locations.

12. The method of claim 11 further comprising using 32 bits to represent each document ordinal and each document location.

13. The method of claim 12, further comprising establishing a first pairing of said document ordinal and document location to indicate a quantity of pairs of document ordinals and document locations stored in said stream.

14. The method of claim 11, wherein said step of creating a plurality of streams further comprises forming a plurality of stream each having a different length such that a first one of said streams has a relatively fewer pairs of document ordinals and document locations than a second one of said streams and said second one of said streams as relatively fewer pairs of document ordinals and document locations than a last one of said streams.

15. The method of claim 14, wherein said step of creating a plurality of streams further comprises creating 16 streams.

16. The method of claim 1, wherein said step of creating a plurality of additional secondary records further comprises creating a plurality of lookup segments.

17. The method of claim 1, wherein said step of creating a plurality of stem words further comprises:

placing each word in a queue for stemming;

obtaining a stop list of terms which are to be excluded from indexing;

comparing each word from said collection of documents with said stop list;

removing each word matching a term on said stop list from said queue.

18. A system for flexible indexing of document content comprising:

a computer system having a storage means for facilitating the retention and recall of a collection of documents to be indexed;

an indexing module for developing character-by-character index of words;

a plurality of records providing character-by-character addressing for said indexing module;

a plurality of streams for recording locations where each indexed word occurs in said collection of documents;

wherein said plurality of records further comprises:

a first record providing an entry point into said index, said first record comprising a plurality of entries, each one of said entries being uniquely associated with a character out of a character set, each one of said collection of documents is formed by characters drawn from said character set;

a plurality of additional primary and secondary records, each one of said additional records provides a character-by-character pathway for locating an occurrence of a stem word in said collection of documents.

19. The system of claim 18, wherein said entry record further comprises:

a lookup portion representing a record location for a first one of said additional records, said first one of said additional records providing a pathway to a second character in said character-by-character pathway for location occurrences of indexed words in said collection of documents;

a translation vector portion representing a translation vector record number and defining a location in one of said plurality of streams, said location providing a cross-reference to a location of an occurrence of said word in said collection of documents.

20. The system of claim 19, wherein said entry record further comprises:

said lookup portion being implemented as a 32-bit representation of said record location;

said translation vector portion being implemented as a 32-bit representation of said location of said cross-reference in one of said streams.

21. The system of claim 18, wherein each one of said plurality of additional primary records further comprises:
- a presence vector having 64 bits, each bit being uniquely associated with a character from said character set, each bit providing an indication of a word continuing with said associated character;
- a plurality of lookup segments, each one of said lookup segments providing information for locating occurrences of said word in said collection of documents.

22. The system of claim 21, wherein said each one of said plurality of lookup segments further comprises:
- a lookup portion representing a record location for one of said additional records, said additional records providing a pathway to a next character in said character-by-character pathway for location occurrences of indexed words in said collection of documents;
- a translation vector portion representing a translation vector record number and defining a location in one of said plurality of streams, said location providing a cross-reference to a location of an occurrence of said word in said collection of documents.

23. The system of claim 22, wherein said plurality of lookup segments comprises eight pairs of lookup portions and translation vector portions, each of said lookup portions comprising 32 bits, each of said translation vector segments representing a translation vector record number, each translation vector entry comprising a 4 bit stream ID and a 28 bit record number, said stream ID identifying which one of said plurality of streams records cross-reference information for locating occurrences of said word in said collection of documents, said record number providing a location within said stream of said cross-reference information.

24. The system of claim 23, wherein said plurality of lookup segments comprises sixty-four pairs of lookup portions and translation vector portions, each of said lookup portions comprising 32 bits, each of said translation vector segments comprising 32 bits and representing a translation vector record number, each translation vector entry comprising a 4 bit stream ID and a 28-bit record number, said stream ID identifying which one of said plurality of streams records cross-reference information for locating occurrences of said word in said collection of documents, said record number providing a location within said stream of said cross-reference information.

25. The system of claim 18 additionally comprising a translation vector mapping stem words to locations.

26. The system of claim 18, wherein each one of said plurality of additional secondary records further comprises a plurality of lookup segments, each one of said lookup segments providing information for locating occurrences of said word in said collection of documents.

* * * * *